United States Patent
Munley et al.

(10) Patent No.: US 6,658,932 B2
(45) Date of Patent: Dec. 9, 2003

(54) MEASURING DEVICE AND PROCESS SEAL THEREFOR

(75) Inventors: James P. Munley, Ballston Spa, NY (US); Richard J. Bond, Pattersonville, NY (US)

(73) Assignee: Anderson Instrument Co., Inc., Fultonville, NY (US)

(*) Notice: Subject to any disclaimer, the term of this patent is extended or adjusted under 35 U.S.C. 154(b) by 120 days.

(21) Appl. No.: 09/927,013

(22) Filed: Aug. 9, 2001

(65) Prior Publication Data

US 2003/0030517 A1 Feb. 13, 2003

(51) Int. Cl.[7] .................................................. H01P 1/08
(52) U.S. Cl. ...................... 73/290 V; 333/252; 333/254
(58) Field of Search ................. 333/252, 254; 73/290 V

(56) References Cited

U.S. PATENT DOCUMENTS

| | | |
|---|---|---|
| 5,262,743 A | 11/1993 | Jean |
| 5,305,237 A | 4/1994 | Dalrymple et al. |
| 5,495,218 A * | 2/1996 | Erb et al. .................. 333/252 |
| 5,507,181 A | 4/1996 | Fox et al. |
| 5,594,449 A | 1/1997 | Otto |
| 5,703,289 A | 12/1997 | Mulrooney |
| 5,847,567 A | 12/1998 | Kielb et al. |
| 5,872,494 A | 2/1999 | Palan et al. |
| 5,877,663 A | 3/1999 | Palan et al. |
| 5,926,080 A | 7/1999 | Palan et al. |
| 6,107,957 A | 8/2000 | Cramer et al. |
| 6,393,909 B1 * | 5/2002 | Fahrenbach et al. ........ 333/252 |

OTHER PUBLICATIONS

"3–A Sanitary Standards for Sensors and Sensor Fittings and Connections Used on Milk and Milk Products Equipment, No. 74–01," Formulated by IAFIS, IAFP, USPHS, EHEDG and DIC, Dairy, Food and Environmental Sanitation, Oct. 2000, pp. 800–807.

* cited by examiner

Primary Examiner—Benny Lee
(74) Attorney, Agent, or Firm—Hoffman, Warnick & D'Alessandro LLC; Spencer K. Warnick

(57) ABSTRACT

A measuring device for determining the level of material in a container including a process seal comprising: a substantially conical portion including a narrow end and a wide end, the conical portion terminating at the wide end in a substantially cylindrical outer surface; and a flange portion extending outwardly from the substantially cylindrical outer surface. The process seal minimizes reflection and attenuation of measuring device energy, seals the connection to the container, and meets sanitary standards.

21 Claims, 5 Drawing Sheets

MEASURING DEVICE AND PROCESS SEAL THEREFOR

BACKGROUND OF THE INVENTION

1. Technical Field

The present invention relates generally to process material level measuring, and more particularly to a measuring device and process seal therefor.

2. Related Art

Various measuring devices have been used to determine the level of process material in a container such as a tank or vessel. Non-process contact devices may use microwaves or ultrasound. Process seals have been used to sealingly secure the measuring device's working components to the containers. These process seals generally have two requirements: seal the connection, and do not interfere with device energy transfer into the container.

U.S. Pat. No. 5,305,237 to Dalrymple et al. discloses a generally conical process lens/seal that requires additional seal members to properly seal. This manner of sealing increases the complexity of replacing the process seal. In particular, when the seal is removed, the secondary seals must also be removed and replaced. Another disadvantage of this system is that the various seal surfaces must mate properly to seal, which increases the chances of leakage.

U.S. Pat. No. 5,262,743 to Jean discloses a process seal having specialized surface grooves for reducing reflection and attenuation of device energy. In one embodiment, Jean discloses a generally conical process seal. Jean, however, does not disclose the manner in which the process seal seals (i.e., prevents the passing of gas or fluid) the connection/joint.

The above-described measuring devices have become increasingly more attractive for material level sensing where sanitary conditions are necessary. One such standard that has been promulgated by, among others, the International Association of Food Industry Suppliers (IAFIS) are the "3-A Sanitary Standards for Sensors and Sensor Fittings and Connection Used on Milk and Milk Products Equipment, Number 74-01," which is hereby incorporated by reference. These standards set out requirements that related art measuring devices and process seals inadequately address.

In view of the foregoing, there is a need in the art for a measuring device and a process seal therefor capable of sealing connection, minimizing reflection and attenuation of device energy, and sanitary standard compliance.

SUMMARY OF THE INVENTION

In a first aspect of the invention is provided a process seal comprising: a substantially conical portion including a narrow end and a wide end, the substantially conical portion terminating at the wide end in a substantially cylindrical outer surface; and a flange portion extending outwardly from the substantially cylindrical outer surface.

A second aspect of the invention is directed to a process seal for use with a measuring device coupled to a process material container, the container including a connector, the process seal comprising: a substantially conical portion; a flange portion integrally connected to a periphery of the substantially conical portion, the flange portion having a first side and a second side; and a ridge extending from the first side for mating with a gasket seat of the connector.

A third aspect of the invention provides a measuring device for connection to an exterior of a process material container, the container having a connector, the measuring device comprising: an electronic measuring system; an adapter coupled to the electronic measuring system; a process seal for sealingly coupling the adapter to the connector, the process seal comprising: a substantially conical portion; a flange portion integrally connected to a periphery of the substantially conical portion, the flange portion having a first side and a second side; and a coupling device for coupling the adapter and the connector together with the flange portion therebetween.

A fourth aspect of the invention includes a measuring device for connection to an exterior of a process material container, the container having a connector, the measuring device comprising: an electronic measuring system; an adapter coupled to the electronic measuring system; a process seal for sealingly coupling the adapter to the connector, the process seal comprising: a substantially conical portion including a narrow end and a wide end, the substantially conical portion terminating at the wide end in a substantially cylindrical outer surface; a flange portion extending outwardly from the substantially cylindrical outer surface; and a coupling device for coupling the adapter and the connector together with the flange portion therebetween.

A fifth aspect of the invention is directed to a process seal for use with a measuring device coupled to a process material container, the container including a connector, the process seal comprising: means for minimizing measuring device energy reflection and attenuation; and means, integrally connected to the means for minimizing, for sealing the measuring device to the container.

A sixth aspect of the invention includes a measuring device for connection to an exterior of a process material container, the container having a connector, the measuring device comprising: means for making a material level measurement; means for directing energy from the means for making a measurement into the container; a process seal including: means for minimizing measuring device energy reflection and attenuation; means, integrally connected to the means for minimizing, for sealing the means for making a measurement to the container; and means for coupling the means for directing and the connector together with the means for sealing therebetween.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Figure 1:
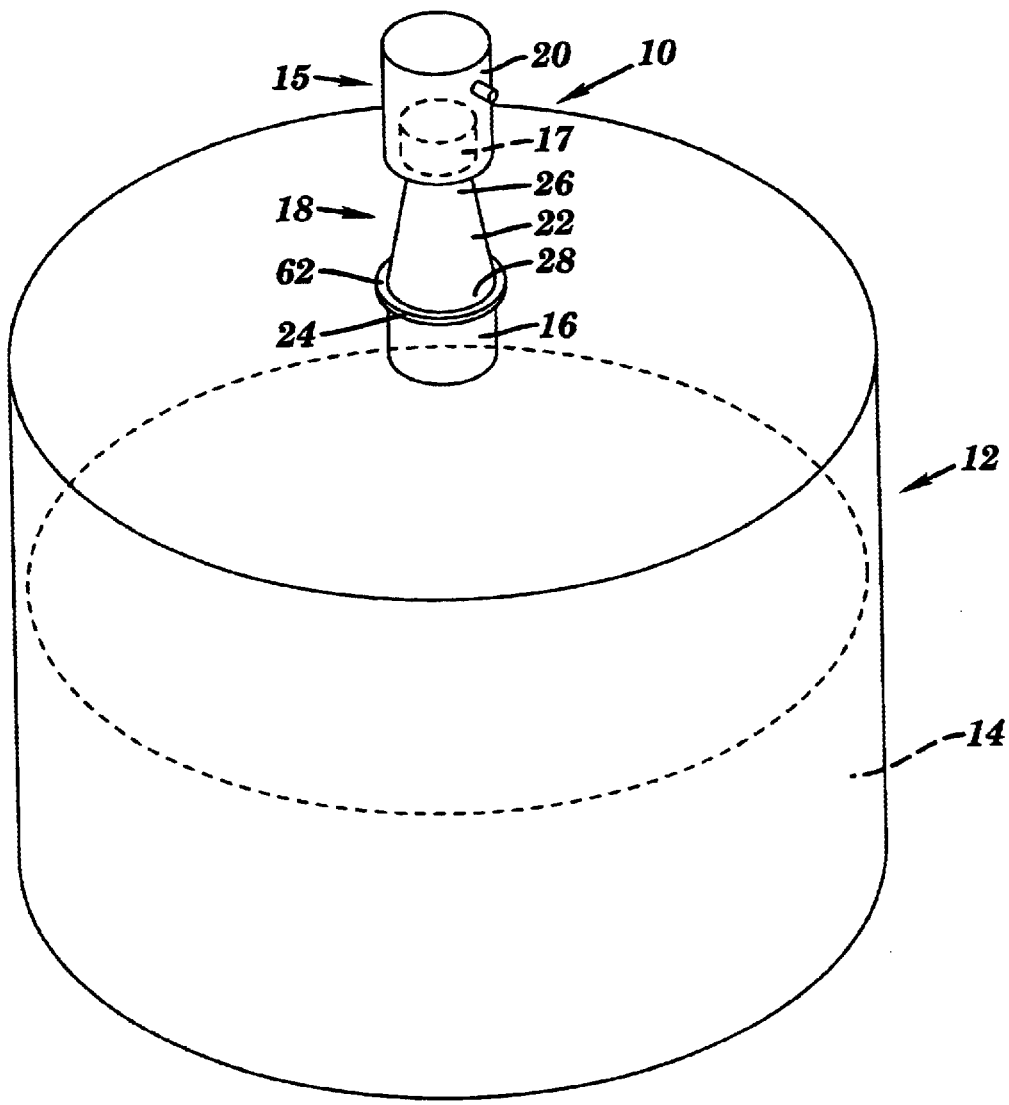
FIG. 1 shows a perspective view of a measuring device in accordance with the invention mounted to a process material container.

Referring to FIG. 1, a perspective view of a measuring device 10 mounted to an exterior of a process material container 12 is shown. Container 12 may contain any manner of material 14 used in any processing. In one example, material 14 is a dairy product such as milk, milk products and culture media. In instances where maintaining a sanitary state is required, container 12 may be constructed of stainless steel such as AISI 300 Series or ACI types, or metal which under conditions of intended use is at least as corrosion resistant as stainless steel, and is nontoxic and nonabsorbent. Container 12 includes a connector 16 for connection with measuring device 10 (see detail in FIG. 8). Connector 16 may be a connection flange or spud, a threaded connection or any other now known or later developed connection member.

Measuring device 10 generally includes an electronic measuring system 15, an adapter 62 coupled to electronic measuring system 15, a process seal (as will be described in more detail below) and a coupling device 24 for connecting system 15 to container 12. Electronic measuring system 15 may be any now known or later developed microwave or ultrasound measuring device, which are commonly used to test the level of material 14 in container 12. System 15 includes operational electronic components 17 and a housing 18. Housing 18 includes a compartment 20 for enclosing electronic components 17 and a horn member 22.

Horn member 22 may be provided to direct measuring device energy, e.g., microwaves, into container 12, and may take a variety of shapes in order to provide this function. For instance, horn member 22 may be substantially cylindrical or, as illustrated, substantially frustoconical. In the case of a frustoconical horn member 22, the member includes a small end 26 connected to compartment 20 and a large end 28. It should be recognized that horn member 22 may not always be necessary to the operation of a measuring device 10 such as that discussed herein. In this case, connector 16 may be coupled directly to compartment 20, or some other intermediate structure.

Turning to FIGS. 2, 3 4A, 4B, a process seal 26 in accordance with an embodiment of the invention is shown. A process seal 26 serves a number of functions. First, it seals the measuring device's connection to container 12 (FIG. 1) to prevent material 14 (FIG. 1) (e.g., a fluid or gas) from escaping and/or prevent contaminants from entering container 12 (FIG. 1). Second, seal 26 passes the measuring device energy (i.e., waves) allowing the energy to pass with minimal attenuation and/or reflection. Third, process seal 26 meets or exceeds sanitary standards that are based on such things as the temperature, pressure, chemical assault of the process material, and geometry to ensure clean-ability. With regard to chemical assault, process seal 26 allows the overall connection to meet or exceed the "3-A Sanitary Standards for Sensors and Sensor Fittings and Connection Used on Milk and Milk Products Equipment, Number 74-01," as promulgated by, among others, the International Association of Food Industry Suppliers (IAFIS) and accepted by the U.S. Food and Drug Administration (FDA). Exemplary requirements of these standards are that connector material has a pore size less than 0.20 μm (micrometers), can withstand sterilization by saturated steam or water under pressure (at least 15.3 psig or 106 kPa) and a temperature of at least 250° F. (121° C.). In one embodiment, process seal 26 is made of a polytetrofluroethylene (PTFE) material exhibiting the above characteristics. In addition, process seal 26 material also preferably exhibits a low dielectric constant.

Figure 2:
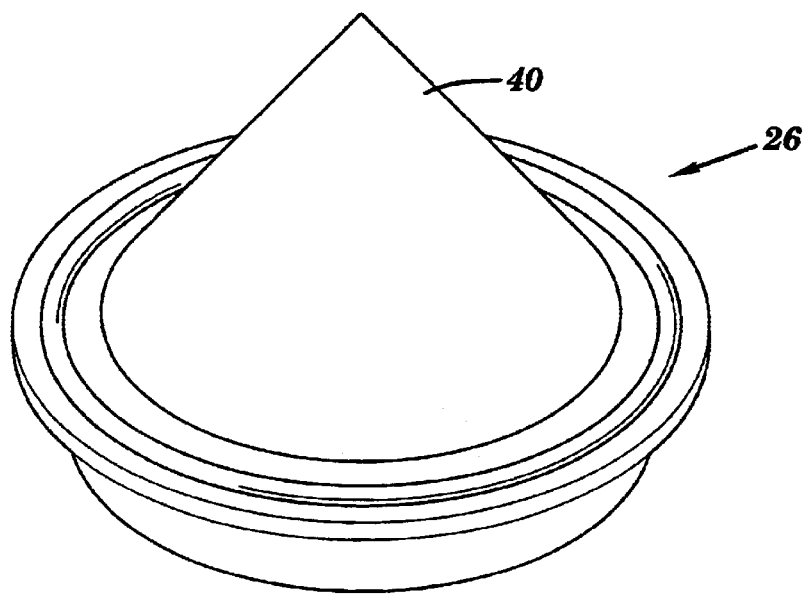
FIG. 2 shows a perspective view of a process seal.
Figure 3:
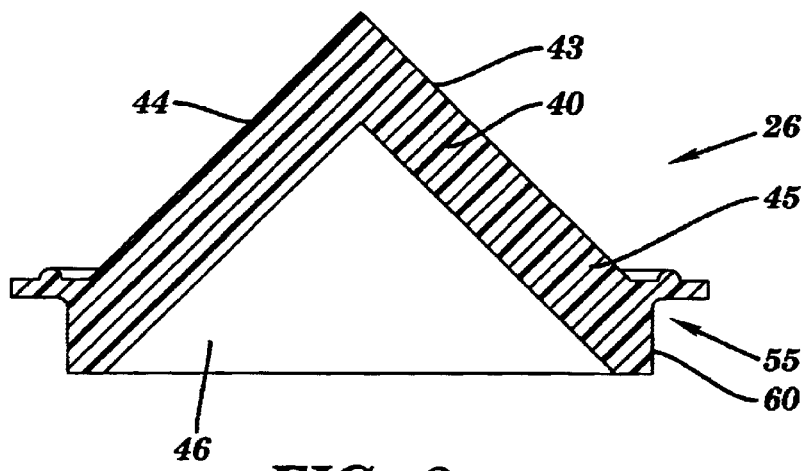
FIG. 3 shows a cross-sectional view of the process seal of FIG. 2.
Figure 4A:
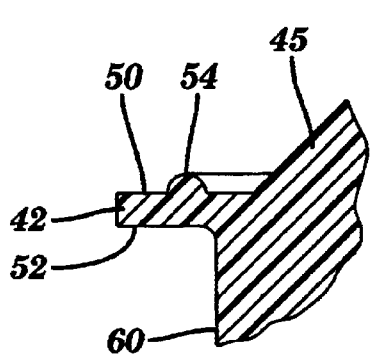
FIG. 4A shows a detail cross-sectional view of the process seal of FIG. 2.
Figure 4B:
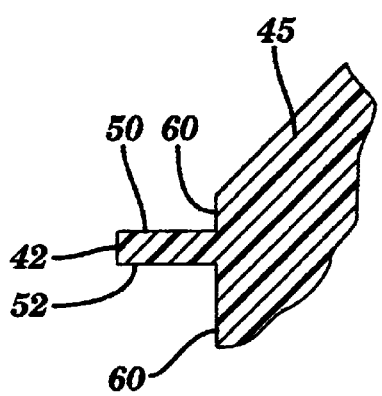
FIG. 4B shows a detail cross-sectional view of an alternative embodiment of the process seal of FIG. 1.

As shown in FIGS. 2 and 3, process seal 26 includes a substantially conical portion 40 and a gasket, flange portion 42. As shown in FIG. 3, substantially conical portion 40 includes an externally, substantially conical side 44 for facing into container 12 (FIG. 1) or connector 16 (FIG. 1), and an inwardly, substantially conical side 46 for facing towards housing 18 (FIG. 1). The substantially conical sides 44, 46 are angled as to, at the very least, allow device energy (i.e., waves) to pass with minimal attenuation and/or reflection. Substantially conical portion 40 also includes a narrow end 43 and a wide end 45. As shown in FIGS. 3, 4A and 4B, wide end 45 terminates in a substantially cylindrical outer surface 60. Flange portion 42 is integrally connected to a periphery 48 of conical portion 40, and extends outwardly from substantially cylindrical outer surface 60. As shown in FIG. 4A, flange portion 42 extends outwardly from substantially cylindrical surface 60 adjacent wide end 45, where substantially conical portion 40 ceases. In an alternative embodiment shown in FIG. 4B, flange 42 may extend outwardly from anywhere along the length of substantially cylindrical surface 60.

Figure 8:
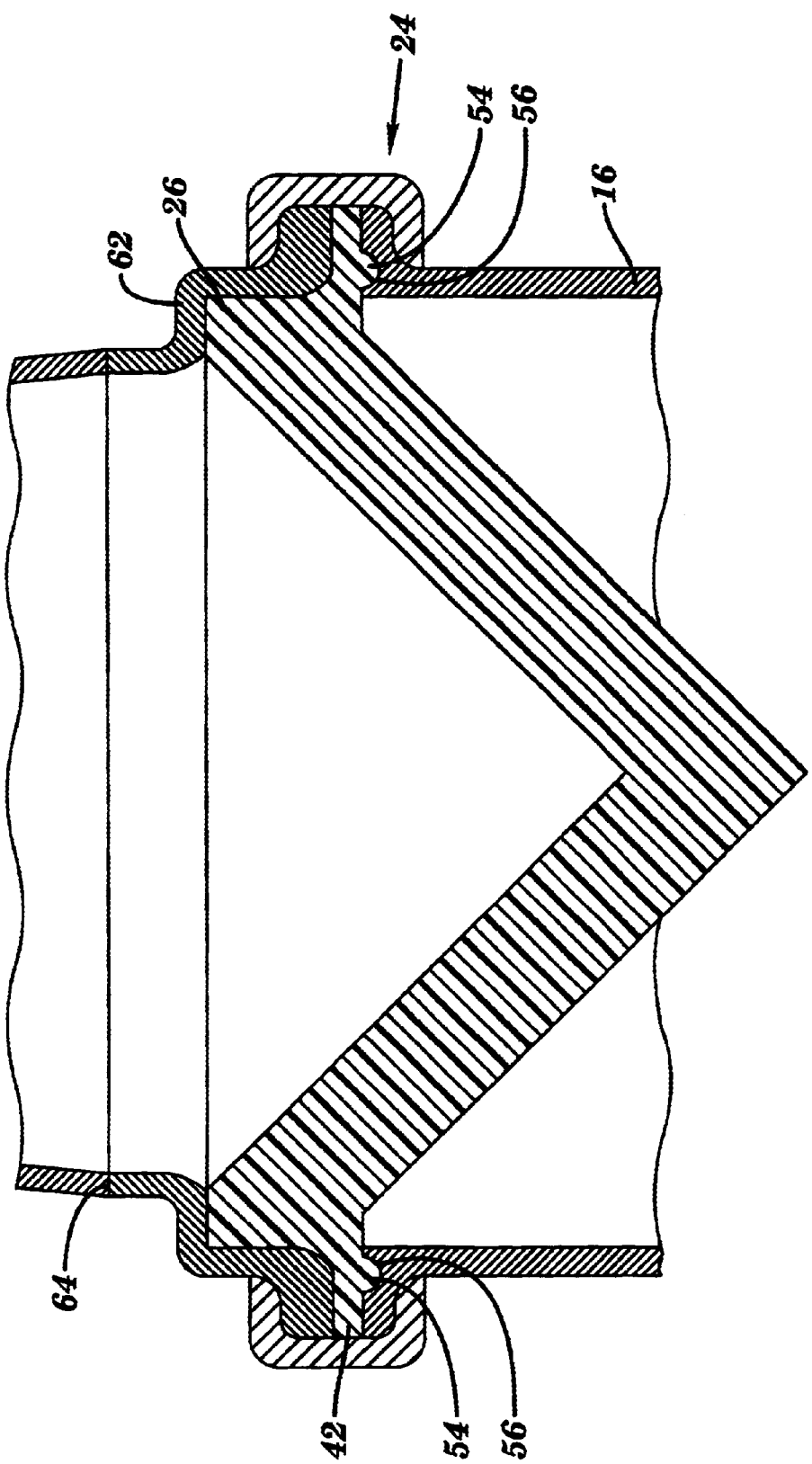
FIG. 8 shows a cross-sectional view of the measuring device connection to the container.

As further shown in FIGS. 4A, 4B, flange portion 42 includes a first side 50 and a second side 52. First side 50 may include a raised ridge 54 (FIG. 4A) that runs about the surface of first side 50. As shown in FIG. 8, raised ridge 54 is sized so as to mate with a corresponding gasket seat 56 of connector 16. Raised ridge 54 and gasket seat 56 are preferably less than approximately one quarter inch height/depth. It should be recognized that where process seal 26 does not require raised ridge 54 and gasket seat 56 to seal, those components may be removed (FIG. 4B). That is, first side 50 is substantially flat, as shown in FIG. 4B.

Figure 5:
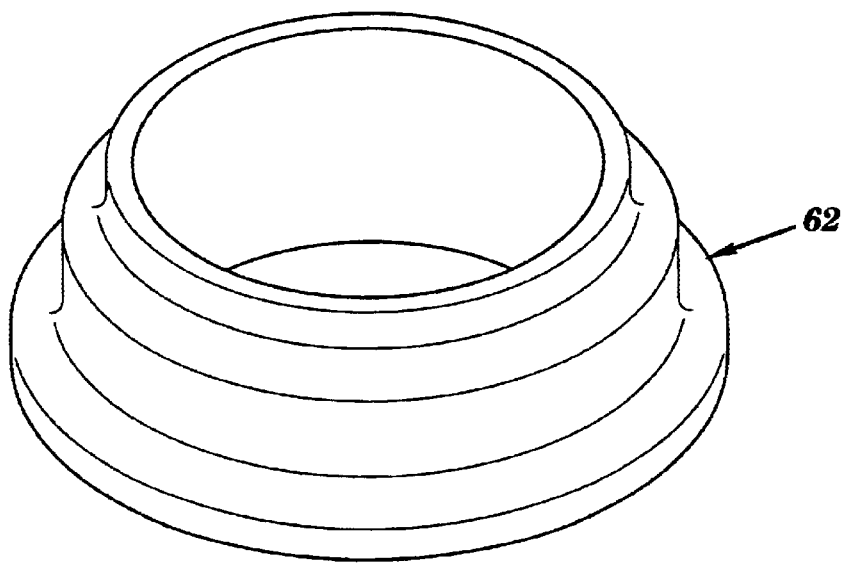
FIG. 5 shows a perspective view of an adapter for a horn member of the measuring device of FIG. 1.

With continuing reference to FIGS. 4A and 4B, second side 52 of flange portion 42 runs into substantially cylindrical surface 60 of process seal 26. In combination, surface 60 and second side 52 form a first mating surface 55 for born member 22 of measuring device 10. More specifically, in a preferred embodiment, horn member 22 (or whatever portion of housing 18 couples to connector 16) includes an adapter 62, shown in FIGS. 5, 6 and 8 that mates with first mating surface 55.

Figure 6:
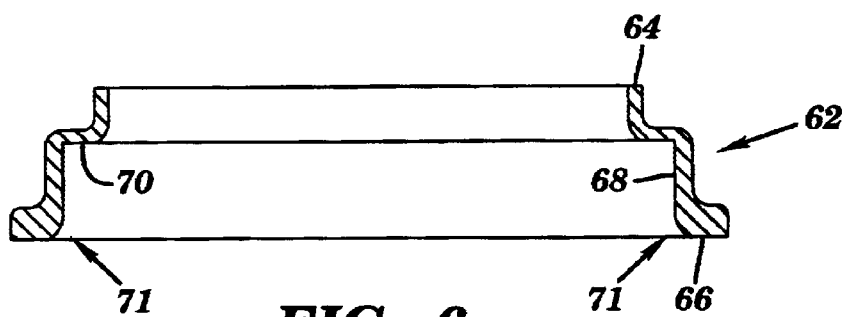
FIG. 6 shows a cross-sectional view of the adapter of FIG. 5.

As shown in FIG. 6, adapter 62 includes a housing/horn member connection surface 64 that is welded or otherwise permanently attached to electronic measuring system 15. That is, adapter 62 is attached to large end 28 of horn member 22, or, where horn assembly 22 is not provided, compartment 20 or some other intermediate structure. Adapter 62 also includes a first surface 66 that mates with second side 52 of flange portion 42; a second surface 68 that mates with substantially cylindrical surface 60 of flange portion 42; and a third surface 70 that mates with an end 72 (FIGS. 3 and 8) of process seal 26. The first surface 66 and second surface 68 form a second mating surface 71 that is substantially complementary to first mating surface 55 of process seal 26.

Figure 7B:
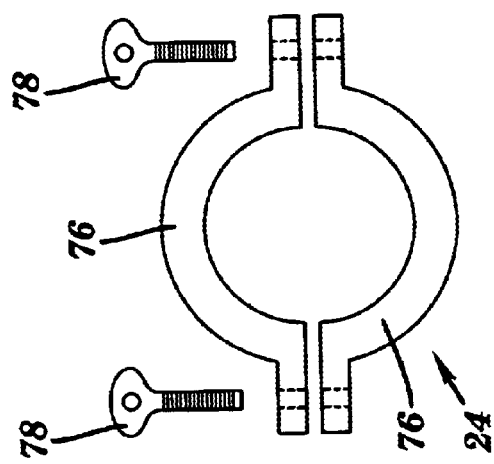
FIGS. 7A and 7B show a perspective view of various coupling devices.
Figure 7A:
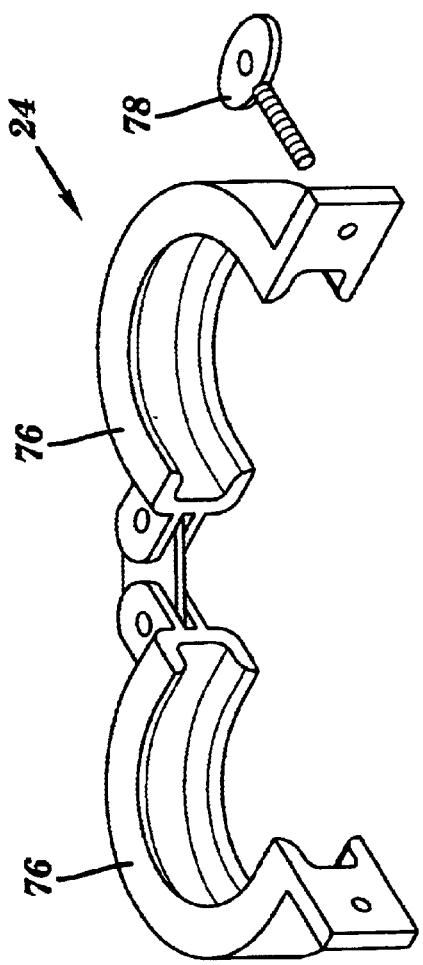

Turning to FIGS. 7A, 7B, coupling device 24 for connecting system 15, adapter 62, process seal 26 and connector 16 together is shown in more detail. Coupling device 24 may be any type of well known ring clamp such as those available through Tri-Clover Company Devices such as coupling device 24 generally include one to three clamping members 76 shaped to compress exterior surfaces of mating components together. Clamping members may be flexible members, pivotally coupled rigid members, or uncoupled rigid members capable of fastening together. Clamping members 76 may be compressed against exterior surfaces of mating components by a toggle device, or one or more threaded fasteners 78. Other exemplary coupling devices are disclosed in the Tri-Clover/Company brochure, which is hereby incorporated by reference. If a threaded connector 16 is used, coupling device 24 may take a complementary threaded form.

FIG. 8 illustrates the overall connection of electronic measuring system 15 to connector 16 and container 12. Coupling device 24 couples electronic measuring system 15, via adapter 62, and connector 16 together with process seal 26 and its flange portion 42 therebetween. More specifically, clamping member(s) 76 engage an exterior clamp surface 80 (FIGS. 5 and 8) of adapter 62 and an exterior clamp surface 82 (FIG. 8) of connector 16. Flange portion 42 is sized such that compression of adapter 62 and connector 16 together compresses flange portion 42 to seal the connection.

The above-described measuring device and process seal therefor are capable of sealing connection, minimizing reflection and attenuation of device energy and sanitary standard compliance.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. For instance, while components of process seal 26, such as flange portion 42, have been shown in a circular form, it should be recognized that components may be any shape required.

What is claimed is:

1. A process seal comprising:
   a substantially conical portion including a narrow end and a wide end,
   the substantially conical portion terminating at the wide end in a substantially cylindrical outer surface; and
   a flange portion extending outwardly from the substantially cylindrical outer surface, the flange portion including a first side having raised ridge.

2. The process seal of claim 1, wherein the seal is comprised of a material having an average pore size less than 0.20 micrometers.

3. The process seal of claim 1, wherein the ridge extends less than one quarter inch from the first side.

4. A process seal for use with a measuring device coupled to a process material container, the container including a connector, the process seal comprising:
   a substantially conical portion;
   a flange portion integrally connected to a periphery of the substantially conical portion, the flange portion having a first side and a second side; and
   a ridge extending from the first side for mating with a gasket seat of the connector.

5. The process seal of claim 4, wherein the seal is comprised of a material having an average pore size less than 0.20 micrometers.

6. The process seal of claim 4, wherein the ridge extends less than one quarter inch from the first side.

7. The process seal of claim 4, further comprising a cylindrical outer surface extending from the second side of the flange portion,
   wherein the cylindrical outer surface and the second side provide a mating surface of the measuring device.

8. A measuring device for connection to an exterior of a process material container, the container having a connector, the measuring device comprising:
   an electronic measuring system;
   an adapter coupled to the electronic measuring system;
   a process seal for sealingly coupling the adapter to the connector, the process seal comprising:
      a substantially conical portion including a narrow end and a wide end,
      the substantially conical portion terminating at the wide end in a substantially cylindrical outer surface;
      a flange portion extending outwardly from the substantially cylindrical outer surface, the flange portion including a ridge extending from a first side thereof; and
   a coupling device for coupling the adapter and the connector together with the flange portion therebetween.

9. The measuring device of claim 8, wherein the ridge mates with a gasket seat of the connector.

10. The measuring device of claim 9, wherein the ridge extends less than one quarter inch from the first side.

11. The measuring device of claim 8, wherein the coupling device is a clamp.

12. The measuring device of claim 8, wherein the electronic measuring system is a microwave system.

13. The measuring device of claim 8, further comprising a horn member coupled between the adapter and the electronic measuring system.

14. A measuring device for connection to an exterior of a process material container, the container having a connector, the measuring device comprising:
    an electronic measuring system;
    an adapter coupled to the electronic measuring system;
    a process seal for sealingly coupling the adapter to the connector, the process seal comprising:
       a substantially conical portion;
       a flange portion integrally connected to a periphery of the substantially conical portion, the flange portion having a first side and a second side and a ridge extending from the first side; and
    a coupling device for coupling the adapter and the connector together with the flange portion therebetween.

15. The measuring device of claim 14, wherein the coupling device is a clamp.

16. The measuring device of claim 14, wherein the electronic measuring system is a microwave system.

17. The measuring device of claim 14, further comprising a horn member coupled between the adapter and the electronic measuring system.

18. The measuring device of claim 14, wherein the ridge mates with a gasket seat of the connector.

19. The measuring device of claim 18, wherein the ridge extends less than one quarter inch from the first side.

20. The measuring device of claim 14, wherein the process seal further comprises a substantially cylindrical outer surface extending from the second side of the flange portion,
    wherein the substantially cylindrical outer surface and the second side provide a first mating surface for the adapter.

21. The measuring device of claim 20, wherein the adapter includes a second mating surface substantially identical to the first mating surface.

* * * * *